United States Patent
Lee

(10) Patent No.: US 6,431,486 B1
(45) Date of Patent: Aug. 13, 2002

(54) BRAKING STRUCTURE FOR A TAPE MEASURE

(76) Inventor: Shih-Lin Lee, No.22, Lane 81, sec.2, Tunha S. Rd., Taipei City (TW)

(*) Notice: Subject to any disclaimer, the term of this patent is extended or adjusted under 35 U.S.C. 154(b) by 7 days.

(21) Appl. No.: 09/691,166

(22) Filed: Oct. 19, 2000

(51) Int. Cl.$^7$ .......................... B65H 75/30; B65H 75/48
(52) U.S. Cl. ...................................... 242/381.3; 33/767
(58) Field of Search .......................... 242/381.3; 33/767

(56) References Cited

U.S. PATENT DOCUMENTS

| | | | | |
|---|---|---|---|---|
| 3,164,907 A | * | 1/1965 | Quenot | 33/767 |
| 4,205,448 A | * | 6/1980 | Asai | 33/767 |
| 4,288,923 A | * | 9/1981 | Duda | 33/767 |
| 4,449,302 A | * | 5/1984 | Drechsler | 33/767 |
| 4,927,092 A | * | 5/1990 | Ingram, II | 242/381.3 |
| 5,245,761 A | * | 9/1993 | Waldherr | 33/767 |
| 5,395,069 A | * | 3/1995 | Chen | 242/381.3 |
| 5,400,521 A | * | 3/1995 | Waldherr | 33/767 |
| 5,657,551 A | * | 8/1997 | Lin | 33/767 |
| 6,032,380 A | * | 3/2000 | Li | 33/767 |
| 6,276,071 B1 | * | 8/2001 | Khachatoorian | 33/767 |

* cited by examiner

Primary Examiner—Donald P. Walsh
Assistant Examiner—Roberto DiMichele
(74) Attorney, Agent, or Firm—Rosenberg, Klein & Lee

(57) ABSTRACT

A tape measure having a braking structure is provided. The tape measure includes a casing having upper and lower portions defining therebetween an inner compartment, as well as at least one stopping block extending into the inner compartment. The tape measure further includes a tape assembly disposed in the inner compartment, a displaceable release key coupled to the casing, a braking element pivotally coupled to the casing, a stopping piece displaceably disposed in the inner compartment, and a resilient member extending between portions of the braking element and release key. The braking element is pivotally displaceable between braking and debraking position, and is formed with distal first and second ends. The first end is coupled to a first part of the release key for displacement responsive thereto. The stopping piece is reversibly displaceable between clamping and releasing positions, and engages the second end of the braking element for displacement to its clamping position responsive to the braking element's displacement to the braking position. In its clamping position, the stopping piece captures a portion of the tape assembly's tape against the casing's stopping block. The resilient member serves to resiliently bias the braking element to the braking position.

6 Claims, 3 Drawing Sheets

BRAKING STRUCTURE FOR A TAPE MEASURE

BACKGROUND OF THE INVENTION

1. Field of the Invention

The invention relates to a braking structure for a tape measure, and in particular, to a braking structure for a tape measure in which a stopping piece is pressed in biased manner using the resilience force of a spring.

2. Description of the Prior Art

In a conventional braking structure for a tape measure, the essential elements thereof, i.e., the releasing key, the braking element, and the stopping piece are characterized in that they are all made of plastics and are used to clamp the tape measure without the bias of any resilience force other than that inherent in the plastics. As such, the clamping capability of the braking structure against the tape measure is insufficient. Immediately after the tape is pulled out, the user has often to move the snap key to lock the tape. Otherwise, a slight careless movement will lead to retraction of the tape at once; hence, the user himself or other person nearby may be hurt by the sudden unexpected retraction. On the other hand, in using a conventional snap key, the constant pushing open or snap fastening thereof tends to cause fatigue of its push and snap components. Further, the conventional braking structure typically is high in cost and is not easy to incorporate, in addition to being susceptible to damage.

There is, therefore, a need for a braking structure which overcomes the many disadvantages of conventional structures. The tape measure braking structure of the present invention overcomes the disadvantages of such conventional braking structures for a tape measure, introducing improvement and innovation.

SUMMARY OF THE INVENTION

An object of the present invention is to provide a braking structure for a tape measure which is biased to press against a stopping piece using the resilience force of a spring, and is thereby adapted to provide a greater breaking force for a tape measure.

These and other objects are achieved by the subject braking structure for a tape measure, which comprises an upper casing, a lower casing, a clip for wearing, a tape assembly, a release key, a braking element, a spring, a stopping piece, and a buffering piece. The stopping blocks are provided at respective tape outlets of said upper and lower casings and are provided on their top with contours that correspond to the contour provided at said stopping piece, such that the tape can be clamped therebetween to prevent retraction. A screw port is provided at the upper surface of said upper casing for fastening said clip to said tape measure.

The tape assembly is biased to retract said tape measure, and is slipped on a tape shaft protruded from said lower casing so that the user may conveniently pull and withdraw the tape. The release key, together with said braking element and said spring, constitute a push key switch between said upper and lower casings. A spring is provided on said braking element, disposed between said braking element and an end of said release key. A resilient biasing action thus results to force the braking element away from the release key.

The stopping piece is configured generally as a rectangular flat plate-shaped pushing bar and is positioned between said braking element and a portion of the tape of said tape means. One of its ends is formed with a tapered sectional surface that, in conjunction with the stopping blocks provided on the upper and lower casings, form two sectional surfaces having a clamping action upon the tape portion.

The buffer piece is formed by an elastic piece having two arc features at one end and is mounted on the peripheral side at the tape outlets of said upper and lower casings. It is positioned just beneath he tape, such that during withdrawal or retraction of the tape, it safety stops an L-shaped stopping angle at the end of the tape in buffered manner.

The braking structure for a tape measure according to the present invention incorporates a structure between the release key and the braking element in the braking structure, so as to provide a resilient braking force sufficient even for larger tape measures. Specifically, the braking structure takes advantage of the resilience force of a spring in said braking structure to push said braking element against the stopping piece, so as to capture the tape tightly and intimately against the stopping blocks provided between said upper and lower casings. This releasably fixes the tape during use.

BRIEF DESCRIPTION OF THE DRAWINGS

The drawings disclose an illustrative embodiment of the present invention which serves to exemplify the various advantages and objects thereof, and are as follows.

DETAILED DESCRIPTION OF THE PREFERRED EMBODIMENTS

Figure 1:
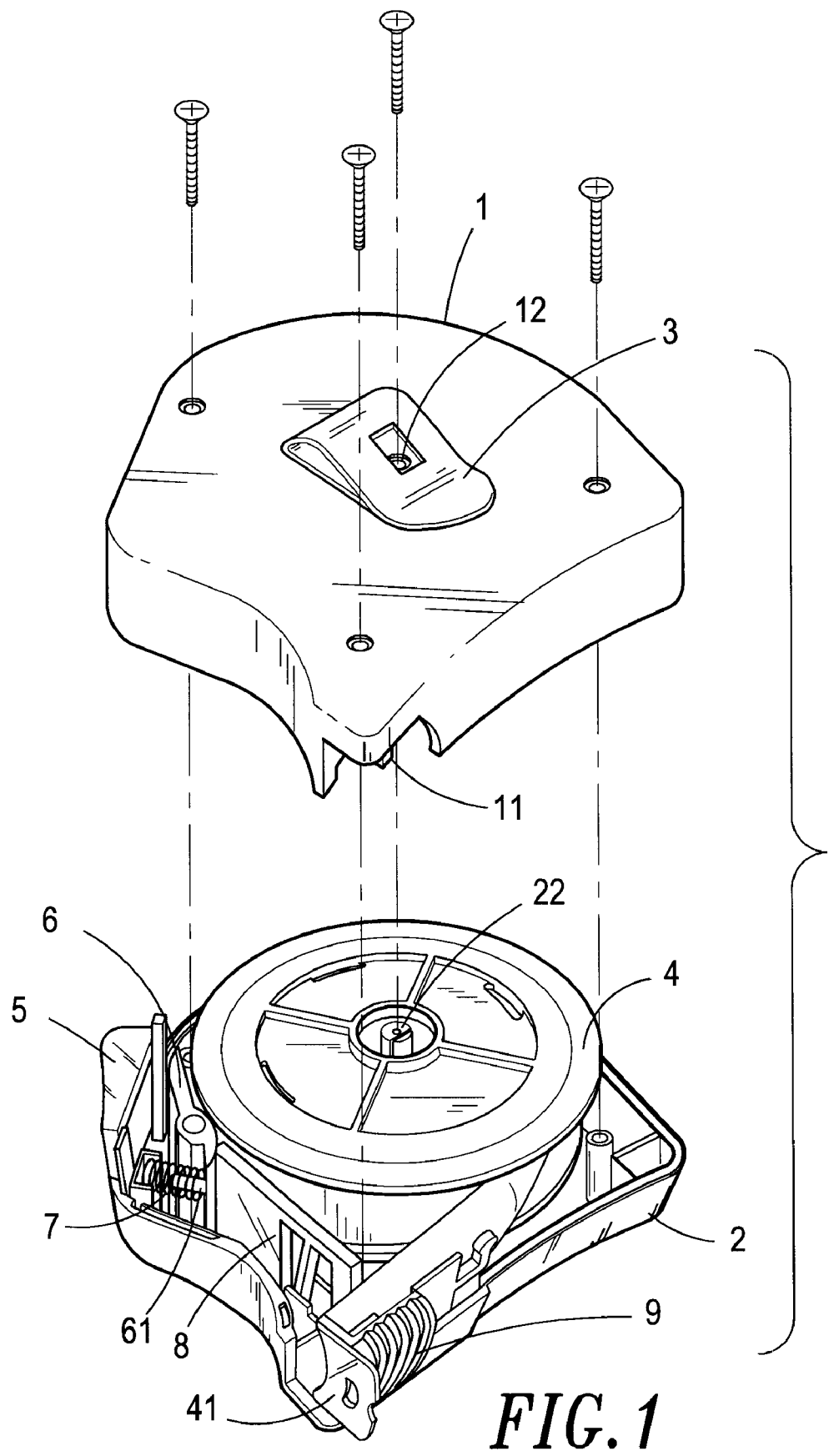
FIG. 1 is an exploded perspective view of a braking structure for a tape measure according to the invention.
Figure 2:
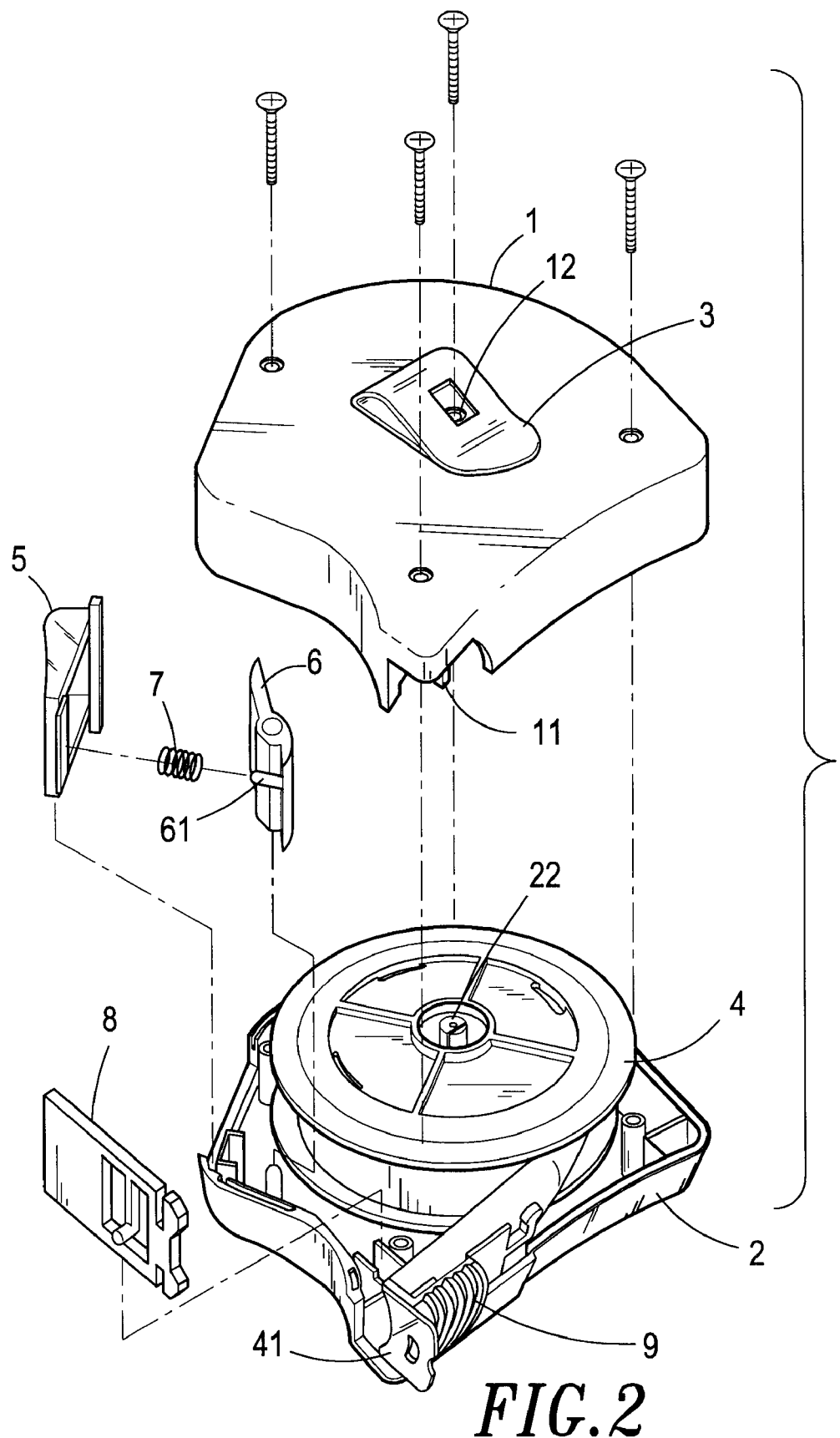
FIG. 2 is an exploded perspective view of a braking structure for a tape measure according to the invention.

Referring to FIGS. 1 and 2, the braking structure for tape measure according to the invention comprises essentially an upper casing 1, a lower casing 2, a clip for wearing 3, a tape assembly 4, a release key 5, a braking element 6, a spring 7, a stopping piece 8, and a buffering piece 9. Stopping blocks 11, 21 are further provided at respective tape outlets of the upper and lower casings 1, 2. Each stopping block is provided at its top with a contour that corresponds to the contour provided at the stopping piece 8 such that the tape can be clamped therebetween to prevent the tape from retracting. A screw port 12 is provided at the upper surface of the upper casing 1 to fix the clip 3 so that a user may conveniently wear the tape measure.

The tape assembly 4 is used to retract the tape measure, and is slipped on a tape shaft 22 protruded from the lower casing 2 to be conveniently pulled and withdrawn by the user. The release key 5 together with the braking element 6 and spring 7 constitute a push key switch between the upper and lower casings 1, 2, wherein a spring stud 61 is provided on the braking element 6. The spring 7 is slipped on the spring stud 61 in such manner that the spring 7 can bear against one end of the release key 5 and press the braking element 6 at one end. This causes the braking element 6 to pivot such that its other end bears against the other end of the release key 5, resiliently biasing it thereby.

The stopping piece 8 is generally configured as a rectangular flat plate-shaped pushing bar and is positioned between the braking element 6 and the tape. One of its ends is formed with a tapered sectional surface that, in conjunction with the opposed correspondingly contoured surfaces of the stopping blocks 11, 21 provided on the upper and lower casings 1, 2, clamp therebetween the tape of the tape assembly 4. The buffer piece 9 is formed with an elastic piece having two arc features at one of its ends, and is mounted at a peripheral sidewall adjacent the tape outlet of the upper and lower casings 1, 2. It is as well positioned just beneath the tape, such that during retraction of the tape, it resiliently buffers the impact of an L-shaped stopping angle 41 at the end of the tape.

Figure 3:
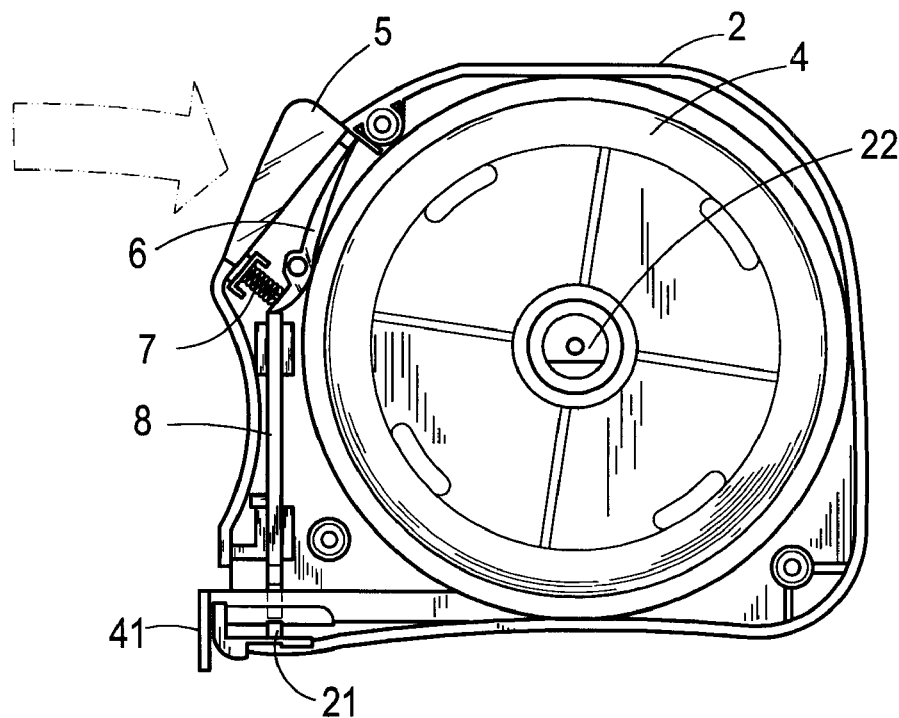
FIG. 3 is a view showing the tape-braked situation of said braking structure for a tape measure; and, FIG. 4 is a view showing the tape-debraked situation of said braking structure for a tape measure.
Figure 4:
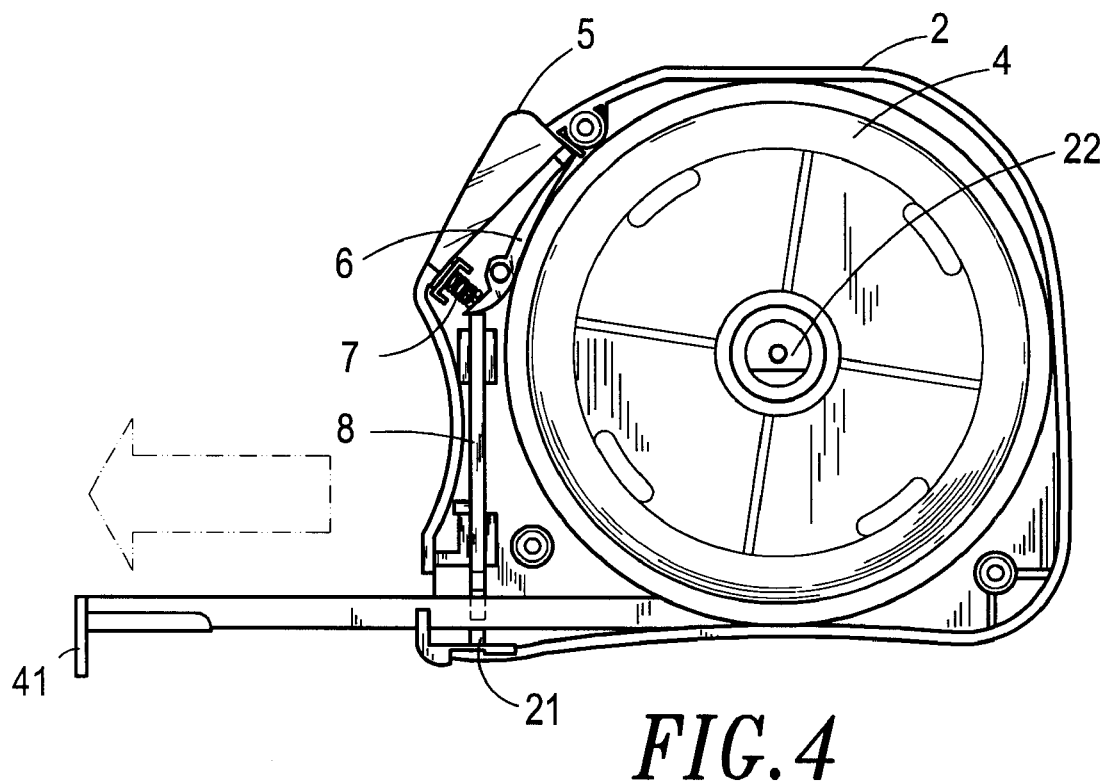

Referring to FIGS. 3 and 4, respectively showing the braking and debraking configurations of the braking structure for tape measure according to the invention, to withdraw the tape, the user presses the release key 5 to depress the top end of the braking element 6 in turn. The braking element 6 pivots to apply a leverage force with its lower end against the spring 7 provided on the spring stud 61 protruding therefrom. This frees the stopping piece 8 to lift from and release the originally clamped tape, as shown in FIG. 4. In order to retract the tape, upon releasing the release key 5, the braking element 6 will, under the action of the resilience force of the spring 7, return to its original position. Under the pushing resilience force of the spring 7 conveyed by the braking element 6, the engaging portion of the stopping piece 8 will again clamp the tape against the stopping blocks 11, 21 (only stopping block 21 is shown) provided on the upper and lower casings 1, 2, as shown in FIG. 3. This yields a braking action upon the tape.

The braking structure for a tape measure according to the invention has the following advantages over the above-mentioned conventional techniques:

1. By virtue of the resilience force of the spring in the construction of the braking structure for a tape measure according to the invention, the braking structure is capable of generating the greater resilient braking forces required in larger tape measures.
2. After withdrawal, the tape will not immediately retract; hence, the user can operate it safely.
3. The embarrassment of braking failure typical of conventional snap key-braking structures with frequent use is avoided.

Many changes and modifications in the above described embodiment of the invention can, of course, be carried out without departing from the scope thereof. Accordingly, to promote the progress in science and useful arts, the invention is disclosed and is intended to be limited only by the scope of the appended claims.

What is claimed is:

1. A tape measure having a braking structure comprising:

a casing having upper and lower portions defining therebetween an inner compartment, said casing defining at least one stopping block extending into said inner compartment;

a tape assembly disposed in said inner compartment, said tape assembly including a retractably spooled tape, said tape having a free end disposed outside said casing;

a displaceable release key coupled to said casing, said release key having first and second parts;

a braking element pivotally coupled to said casing for pivotal displacement relative thereto between braking and debraking positions, said braking element having distal first and second ends, said first end being coupled to said first part of said release key for displacement responsive thereto;

a stopping piece displaceably disposed in said inner compartment for reversible displacement between clamping and releasing positions, said stopping piece engaging said second end of said braking element for displacement to said clamping position responsive to displacement of said braking element to said braking position, said stopping piece in said clamping position capturing a portion of said tape against said stopping block; and a resilient member extending between said second end of said braking element and said second part of said release key for resiliently biasing said braking element to said braking position thereof.

2. The tape measure as recited in claim 1 wherein said first part of said release key is displaceable to pivotally displace said first end of said braking element for leveraged responsive displacement of said second end of said braking element relative to said release key second part.

3. The tape measure as recited in claim 2 wherein said second end of said braking element includes planar and arcuate surfaces on opposing sides thereof, and a spring stud projecting from said planar side, said arcuate surface of said stopping piece forming a camming engagement of said stopping piece.

4. The tape measure as recited in claim 3 wherein said resilient member includes a spring coaxially disposed about said spring stud, said spring resiliently biasing said second end of said braking element away from said second part of said release key, said release key second end being stopped against said casing.

5. The tape measure as recited in claim 4 further comprising an attachment clip coupled to said casing.

6. The tape measure as recited in claim 4 further comprising a stopping angle member coupled to said free end of said tape for limiting the retraction thereof, and a buffering piece coupled to said casing for stopping said stopping angle member in cushioned manner.

* * * * *